(12) United States Patent
Coda et al.

(10) Patent No.: US 8,815,115 B2
(45) Date of Patent: Aug. 26, 2014

(54) METHOD FOR THE REMOVAL OF HYDROGEN FROM A HYDROGEN SENSITIVE DEVICE BY MEANS OF A NON-EVAPORABLE YTTRIUM BASED GETTER ALLOY

(75) Inventors: Alberto Coda, Gerenzano (IT); Alessandro Gallitognotta, Origgio (IT); Andrea Conte, Milan (IT); Costanza Dragoni, Lainate (IT); Alessio Corazza, Como-Camnago Volta (IT)

(73) Assignee: Saes Getters S.p.A., Lainate (IL)

( * ) Notice: Subject to any disclaimer, the term of this patent is extended or adjusted under 35 U.S.C. 154(b) by 355 days.

(21) Appl. No.: 13/257,289

(22) PCT Filed: Mar. 9, 2010

(86) PCT No.: PCT/EP2010/052986
§ 371 (c)(1),
(2), (4) Date: Oct. 10, 2011

(87) PCT Pub. No.: WO2010/105945
PCT Pub. Date: Sep. 23, 2010

(65) Prior Publication Data
US 2012/0020862 A1 Jan. 26, 2012

(30) Foreign Application Priority Data
Mar. 18, 2009 (IT) .............................. MI2009A0410

(51) Int. Cl.
*H01J 7/18* (2006.01)
*B01D 53/22* (2006.01)
*C01B 3/02* (2006.01)

(52) U.S. Cl.
USPC .................... 252/181; 252/181.2; 252/181.6; 423/248; 423/648.1

(58) Field of Classification Search
None
See application file for complete search history.

(56) References Cited

U.S. PATENT DOCUMENTS

| | | | |
|---|---|---|---|
| 3,485,343 A | 12/1969 | Jorgensen | |
| 4,455,998 A * | 6/1984 | Kroontje et al. | 126/635 |
| 4,894,584 A * | 1/1990 | Steinmann et al. | 313/557 |
| 5,238,469 A | 8/1993 | Briesacher et al. | |
| 5,324,172 A | 6/1994 | Manini et al. | |
| 6,149,392 A | 11/2000 | Conte | |
| 6,514,430 B1 * | 2/2003 | Corazza et al. | 252/181.1 |

(Continued)

FOREIGN PATENT DOCUMENTS

| | | |
|---|---|---|
| EP | 0869195 B1 | 8/2001 |
| GB | 1248184 | 9/1971 |

(Continued)

OTHER PUBLICATIONS

PCT International Search Report for PCT/EP2010/052986 filed Mar. 9, 2010 in the name of SAES GETTERS S.p.A.

(Continued)

*Primary Examiner* — Melvin C Mayes
*Assistant Examiner* — Sheng H Davis
(74) *Attorney, Agent, or Firm* — Steinfl & Bruno, LLP

(57) ABSTRACT

Getter alloys particularly suitable for hydrogen sorption are described. The getter alloys include a first element consisting of yttrium or a yttrium equivalent mixture, the first element forming at least 30% by atoms of the alloy. A method for removing hydrogen from devices which are sensitive to the presence thereof and hydrogen-sensitive devices which contain the described getter alloys are also described.

17 Claims, 2 Drawing Sheets

(56) References Cited

U.S. PATENT DOCUMENTS

| | | |
|---|---|---|
| 6,832,608 B2 | 12/2004 | Barkai et al. |
| 6,897,551 B2 | 5/2005 | Amiotti |
| 7,180,163 B2 | 2/2007 | Amiotti |
| 2004/0253476 A1* | 12/2004 | Conte et al. .............. 428/660 |
| 2005/0023134 A1* | 2/2005 | Conte et al. ............ 204/192.38 |
| 2005/0089627 A1* | 4/2005 | Chuntonov ................ 427/58 |
| 2008/0202211 A1* | 8/2008 | Wetzig .................... 73/40.7 |
| 2009/0215610 A1* | 8/2009 | Kullberg et al. .......... 502/56 |

FOREIGN PATENT DOCUMENTS

| | | |
|---|---|---|
| WO | 00/07209 | 2/2000 |
| WO | 03/029502 | 4/2003 |
| WO | 2007/148362 | 12/2007 |

OTHER PUBLICATIONS

PCT Written Opinion for PCT/EP2010/052986 filed Mar. 9, 2010 in the name of SAES GETTERS S.p.A.

PCT International Preliminary Report on Patentability for PCT/EP2010/052986 filed Mar. 9, 2010 in the name of SAES GETTERS S.p.A.

Japanese Office Action mailed on Dec. 21, 2012 for Japanese Application 2012-500185 filed on Dec. 6, 2012 in the name of Saes Getters S.P.A. (English translation+Japanese text).

Chinese Office Action mailed on Nov. 30, 2012 for Chinese Application 20108002069.6 filed on Dec. 6, 2012 in the name of Saes Getters S.P.A. (English translation+Chinese text).

* cited by examiner

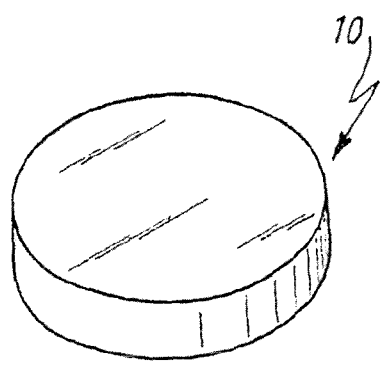
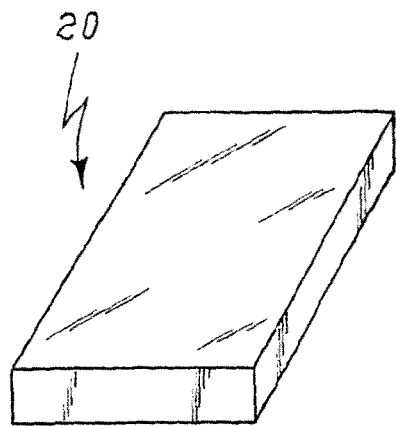
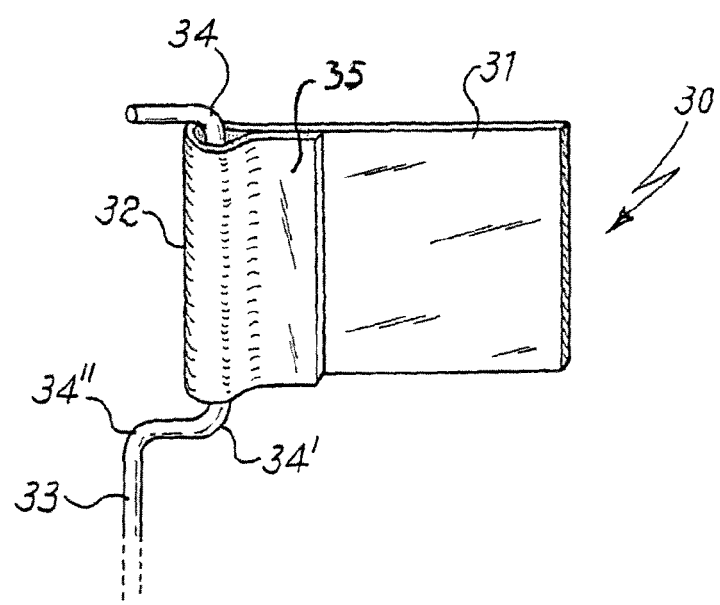

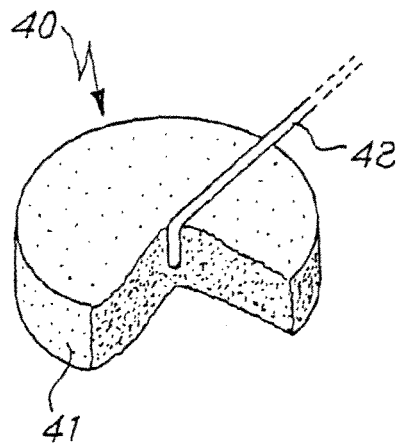
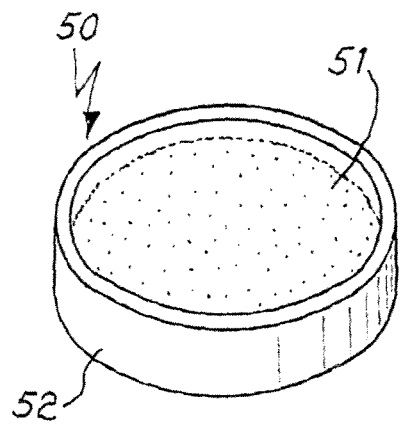
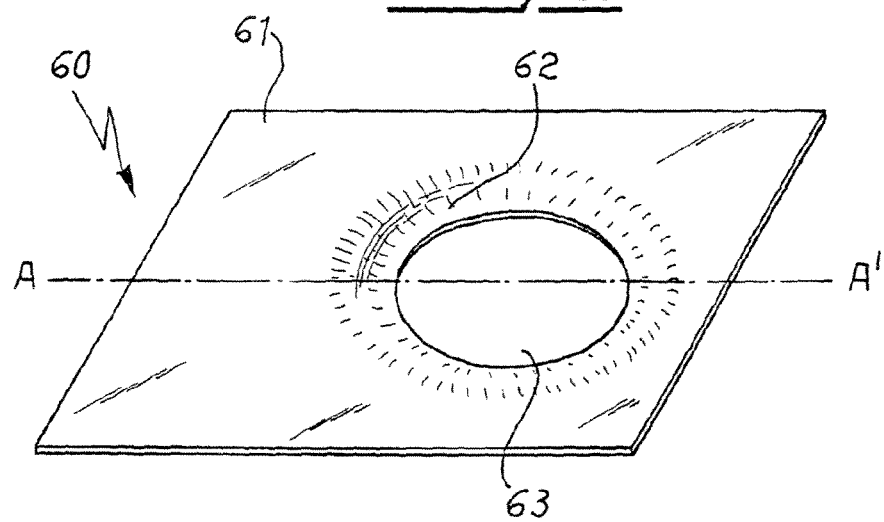
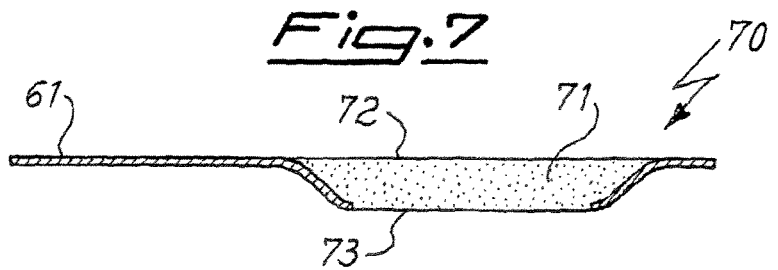

METHOD FOR THE REMOVAL OF HYDROGEN FROM A HYDROGEN SENSITIVE DEVICE BY MEANS OF A NON-EVAPORABLE YTTRIUM BASED GETTER ALLOY

CROSS REFERENCE TO RELATED APPLICATIONS

The present application is the US national stage of International Application PCT/EP2010/052986 filed on Mar. 9, 2010, which, in turn, claims priority to Italian Patent Application MI2009A000410 filed on Mar. 18, 2009.

The present invention relates to new getter alloys having an increased hydrogen capacity, to a method for sorbing hydrogen with said alloys and to hydrogen sensitive devices which employ said alloys for the removal thereof.

The alloys which are the subject-matter of this invention are particularly useful for all the applications which require sorption of meaningful quantities of hydrogen even if used at high temperatures. The use of the getter alloy at high temperature is important since it maximizes the capability of the alloy versus the other gaseous impurities, such as $H_2O$, $O_2$, CO, $CO_2$, $N_2$, but at the same time operation of the alloy at high temperatures negatively impact the capability of the alloy versus the hydrogen removal, and in some cases the alloy itself may become a source of hydrogen contamination.

Therefore the improved characteristics versus hydrogen of the alloy according to the present invention have to be intended and evaluated in the twofold possible meanings of an increased overall capacity for $H_2$ and of a very low hydrogen equilibrium pressure, these properties being present when the alloys are used at low (room) temperature and also when used at high temperature (100° C. or higher). For the most interesting alloys according to the present invention, both these properties should be considered.

Among the most interesting applications for these new sorbing materials, there are solar collectors, with particular reference to receiving tubes which are integral part of said systems, illumination lamps, vacuum pumps and gas purification.

The use of getter materials for hydrogen removal in these applications is already known, but the currently developed and used solutions are not suitable for meeting the requirements which are imposed by the continuous technological developments which set more and more rigid limits and constraints.

In particular, in the field of the receiving tubes for solar collectors the presence of hydrogen is harmful since it increases heat conduction from the central body wherein a heat removing liquid flows, towards the external of the receiving tube, thus progressively decreasing the efficiency thereof. The problems related to the presence of hydrogen are particularly relevant since the fluid which flows in the central body typically comprises oils which decompose at high temperature thus producing said hydrogen.

Also in the new generation receiving tubes, which employ a different material in order to remove the heat, the problems of the presence of hydrogen and the consequent features decay are of particular relevance.

One of the most efficient solutions for hydrogen removal is disclosed in patent EP0869195 B in the name of the Applicant, and makes use of Zirconium-Cobalt-A alloys wherein A can be a maximum of 10% and is selected among Yttrium, Lanthanum, and other Rare Earths. In particular, the alloy having the following weight percentages: Zr 808%-Co 14.2% and A 5%, marketed by the Applicant under the name St 787®, has been particularly appreciated.

An additional problem within the receiving tubes for the solar collectors is connected to the high temperatures reached inside, which cause the getter material to work in unfavorable conditions as regards the hydrogen sorption capacity, which is inversely proportional with respect to the working temperature. To this end, some technical measures have been developed, such as the one described in U.S. Pat. No. 6,832,608 which describes particular solutions for placing the getter material inside the solar collector, having the purpose of shielding the getter material from solar radiation and from the portions having the highest temperature inside the collector.

The use of the above mentioned getter alloy and of shielding solutions is sufficient for meeting the current requirements in the field of the receiving tubes for solar collectors, but not for ensuring those relating to the new generation of receivers, both in terms of working temperature, which is foreseen that could be higher than 500° C., and in terms of hydrogen capacity at the highest working temperature inside the receiving tube of the collector which, in the absence of effective shielding solutions, can be close to the working temperature of the tube.

Another field where the effective removal of hydrogen is required is in the illumination lamps, with particular reference to metal halide discharge lamps wherein the presence of hydrogen even at low levels significantly decreases the lamp features; major information as regards the degradation phenomena can be found in the International patent application publications WO 03/029502 and WO 2007/148362 inherent to a different material for hydrogen sorption.

In this particular field of application not only the material capacity to effectively sorb hydrogen at high temperatures is particularly important, but for some lamps also the low activation temperature of the material as regards the sorption of other gas species, with respect to conventional NEG alloys. As a matter of fact, it is desirable to have materials capable of activating at temperatures not higher than 300° C., as this allows a simpler integration of the activation process of the getter material with the lamp manufacturing process.

Another requirement of the getter material which is present in some type of lamps is that it should be capable of hydrogen sorption at high temperature in the presence of nitrogen or in a nitrogen rich atmosphere.

Another application field which can benefit of the use of getter alloys capable of hydrogen sorption at high temperatures is that of the getter pumps. This type of pumps is described in various patents such as U.S. Pat. No. 5,324,172 and U.S. Pat. No. 6,149,392, both in the name of the applicant.

Being able to use the getter material of the pump at high temperature increases the performance thereof in terms of sorption capacity towards other gases; in particular one of the gases that would be removed in a most efficient way from the pump is methane.

Another field of application that benefits of the advantages of a getter material capable of hydrogen sorption at high temperature is the purification of the gases used in semiconductor industries. As a matter of fact, particularly when high flows are requested, typically higher than some l/min, it is necessary that the getter material works at high temperatures in order to have a sufficient capacity for the removal of gas contaminants such as $H_2O$, $O_2$, $CH_4$, CO, $CO_2$. Clearly, this condition is unfavorable for hydrogen sorption and, in view of this, solutions for operating the purification system with a temperature gradient have been implemented. Typically, the lower portion of the getter material containing cartridge is cooled or anyway it is allowed to work at lower temperatures than the higher portion, in order to favor the hydrogen sorption. This kind of solution is described in U.S. Pat. No. 5,238,469.

It is therefore an object of the present invention to provide a new non-evaporable getter material capable of overcoming the disadvantages of the prior art, in particular capable of having a lower equilibrium pressure of $H_2$ at high temperature. Moreover, some of these materials also have other secondary advantages such as exhibiting a lower activation temperature with respect to getter alloys which are commonly used in the field and being able to operate also in a nitrogen or nitrogen rich atmosphere.

These objects are reached with a non-evaporable getter alloy comprising a first element formed of yttrium or a yttrium equivalent mixture and a second element selected among Si, B, Ge, Pd, Cd, In, Sb, Tl, Pb, Bi, Ag wherein the atomic percentage of said first element is:

comprised between 65 and 98% if said second element is selected among Si, Ge, Pd, Cd, In, Sb, Tl, Pb, Bi;

comprised between 50 and 98% if said second element is Ag, or comprised between 30 and 98% if said second element is B.

In a preferred embodiment the percentage of the second element is at least 5% by atoms and even more preferred is at least 8%.

With yttrium equivalent mixture, a mixture having a preponderant yttrium content is meant, of at least 95% by atoms, with the remaining part being formed essentially of Rare Earths, wherein with essentially it is meant the possible presence of traces of other elements, wherein the total contribution of the traces of other elements is typically not higher than 1% by atoms.

As to the performances of the alloys of the present invention, the getter alloys which are made by using yttrium as first element, with the exception of the inevitable presence of other elements in traces, are preferred. Therefore preferred is the use of essentially yttrium (≥99% at in view of the above definition of the term essentially) as first element.

This definition takes into account that the typically available yttrium is not pure but may contain other elements, such as the above mentioned Rare Earths, nevertheless such presence does not significantly alter the behavior thereof, as far as the present invention is concerned.

The invention will be also illustrated in detail with reference to the drawings, in which:

Figures from 1 to 7 show different possible forms of getter devices made with the alloys according to the invention.

In these figures, the size and the dimensional ratios may be untrue, with the purpose of improving the legibility thereof, and the representation of the various members has only exemplifying purpose for the modality of use of the alloys which are subject-matter of the present invention.

The use of some yttrium-based binary and ternary alloys for hydrogen sorption is described in patent GB 1248184: said document discloses binary and ternary compositions different from those according to the present invention. In particular, as concerns the binary compositions, there are described alloys of yttrium with a second element selected among Zr, Ti, Nb, Hf, Mo, Ta, W, V, without specifying in a significant way the useful ratios for carrying out the invention for the binary compositions; as a matter of fact, in said patent an yttrium content variable between 5 and 99% is specified. Another fundamental difference between the teaching of this patent and the subject-matter of the present invention, is that said prior document teaches that it should be made use of elements which do not form intermetallic compounds with yttrium, differently from the elements used in the present invention, such a difference leading to a highest absorption.

On the contrary, the international patent application WO 03/029502 describes two different kinds of binary yttrium alloys, in particular yttrium-vanadium and yttrium-tin.

The alloys according to the invention can be produced by fusion starting from the pure elements, preferably in powder or pieces, in the desired atomic ratios. The fusion must be carried out in a controlled atmosphere, for example under vacuum or inert gas (preferred is argon), in order to avoid the oxidation of the alloy which is being prepared.

The alloys according to the invention can be used in the form of getter devices made with a single alloy body. FIGS. 1 to 3 show devices of this kind FIGS. 1 and 2 show, respectively, a cylinder 10 and a board 20 made by cutting an alloy sheet of suitable thickness or obtained by compression of alloy powders. For the practical use the devices must be positioned in a fixed position in the container that is to maintain free from hydrogen. The devices 10 and 20 could be fixed directly to an internal surface of the container, for example by spot welding when said surface is made of metal. Alternatively, devices of the kind 10 or 20 can be positioned in the container by means of suitable supports; mounting on the support can be carried out by welding or mechanical compression. FIG. 3 shows another possible embodiment of getter device 30, wherein a discrete body of an alloy according to the invention is used, particularly for those alloys having high plasticity features. In this case the alloy is manufactured in form of a strip, from which pieces 31 having desired size are cut; the piece is bent in the portion 32 around the support 33 in form of a metal wire. Support 33 may be linear, but preferably it is provided with curves 34, 34', 34", that help delocalization of the slug 31; maintaining of the piece shape can be assured by means of one or several welding points (not shown in the figure) in the overlapping zone 35, but also a simple compression during the bending around support 33 can be sufficient when considering the plasticity of these alloys.

Alternatively, other getter devices can be manufactured by using powders of the alloys according to the invention. In the case that powders are used, these preferably have a particle size lower than 500 μm, and even more preferably included between 0 and 125 μm.

Devices based on powders are shown in FIGS. 4 to 7. FIG. 4 shows a broken view of a device 40, having the shape of a tablet 41, wherein support 42 is inserted; such a device can be made for example by compression of powders in a mould, having prepared the support in the mould before pouring the powder. Alternatively, support 42 may be welded to tablet 41. FIG. 5 shows a device 50 formed of powders of an alloy 51 according to the invention pressed in a metal container 52; device 50 may be fixed to a support (not shown in the figure) for example by welding the same to container 52. Finally, FIGS. 6 and 7 show different views of another possible embodiment of a getter device according to the invention. This kind of device is formed of a support 60, manufactured starting from a metal sheet 61: within the sheet a depression 62 is made by means of printing in a suitable mould (not shown), afterwhile part of the bottom portion of the depression is removed by cutting, obtaining a hole 63. The support is kept within the printing mould and the depression is filled with alloy powders, which are then pressed in situ thus obtaining device 70 (seen in cross-section along line A-A' of FIG. 6) wherein the powder package, 71, has two exposed surfaces 72 and 73, for the gas sorption.

In all the devices according to the invention the supports, containers and any other metal part which is not formed of an alloy according to the invention is made of metals having a low vapor pressure, such as tungsten, tantalum, niobium or molybdenum, nickel, nickel iron or steel in order to avoid that these parts may evaporate due to the high working temperature to which said devices are exposed.

The alloys according to the invention may also be used for manufacturing targets to be used in the sputtering technique that causes evaporation thereof on suitable surfaces.

Said targets may be produced by various techniques, for example by means of sintering or high pressure sintering of the powders.

The sputtering technique for depositing getter material thin films is particularly advantageous when applied to the manufacture of supports with integrated getter material to be used in the production of microelectronic devices such as those described in U.S. Pat. No. 7,180,163 and U.S. Pat. No. 6,897,551, both in the name of the applicant. Another technique useful for making thin film getter deposits is the one known in the technical field of e-beam (electron beam) evaporation or the like where the getter is released to form the thin film as a consequence of electron bombardment. More generally may be employed also other techniques that lead to the controlled emission of getter material from the target.

In this respect, it is important to explain that, in the field, alloys that do not evaporate as a consequence of the activation process are indicated and referenced with the term NEG, differently from the so-called evaporable getters, such as for example barium and aluminum based getters described in the published international patent application WO 2000/07209 in the name of the Applicant. Typically, the evaporation processes of these alloys take place in a very quick and uncontrolled way; as a matter of fact, these materials are sometimes also referred to as "flash getters".

Therefore, asserting that the getter alloys according to the present invention, which can be defined as NEG since they do not evaporate as a consequence of the evaporation process thereof, can be deposited in processes such as the sputtering, that is, in PVD processes (Physical Vapor Deposition), is not contradictory in the light of the above mentioned meaning of the term NEG in the technical field.

The sintering or high pressure sintering of the powders may be employed also to form many different shapes such as discs, bars, rings etc. of the non-evaporable getter alloys subject of the present invention, for example to be used within getter pumps.

The inventors discovered that the alloys which are the subject matter of the invention are particularly advantageous for some applications, because of some constrains or particular features which are required.

In particular, in the case of receiving tube for solar collectors it is preferred the use of alloys which are able to sorb hydrogen even at particularly high working temperatures, in some case reaching even 600° C.; in this kind of applications the use of alloys Y—Si and Y—Sb is preferred.

While the use of alloys Y—B, Y—Ge, Y—Si is particularly advantageous in the case of the lamps, obviously with the previously specified levels of Yttrium or of the Yttrium equivalent mixture, the inventors have also noted that alloys Y—Pb, Y—Sb, Y—Cd, Y—Tl, although having interesting features in terms of hydrogen sorption, are much less acceptable in the specific application for the environmental impact problems connected to the use thereof, above all in an highly spread industrial application. On the contrary, considerations based on the cost thereof make the Y—Pd alloy less interesting for this application.

In the field of the gas purification these materials are typically hosted within a suitable container, having an inlet, outlet, and thermoregulating means. In the case of impurities removal from a nitrogen flow, the hydrogen sorbing capacity at high temperatures becomes important: the use of Y—Sb, Y—Pb, Y—B and Y—Pd alloys is preferred.

In the field of getter pumps, the requirement is sorbing hydrogen in an effective way by operating at high temperatures, specifically at 200-400° C., in such a way that the getter material is capable of effectively sorbing the other gas impurities possibly present in the chamber that is to be evacuated. In this case, all the alloys which are the subject-matter of the present invention have features that are advantageous in this application, so that those having higher affinity toward gas impurities at higher temperatures are particularly appreciated. Specifically preferred are therefore the alloys Y—Si, Y—Bi, Y—Sb.

In a second aspect thereof, the invention consists in a method for hydrogen removal from devices which are sensitive to the presence thereof, in the sense that hydrogen negatively impacts the characteristics or performances of the device, by means of a non-evaporable getter alloy comprising a first element formed of yttrium or a yttrium equivalent mixture and a second element selected among Si, B, Ge, Pd, Cd, In, Sb, Tl, Pb, Bi, Ag, wherein the atomic percentage of said first element is:

comprised between 65 and 98% in case that said second element is selected among Si, Ge, Pd, Cd, In, Sb, Tl, Pb, Bi;

comprised between 50 and 98% in case said element is Ag; or comprised between 30 and 98% in case said element is B.

The method according to the invention finds application both by using the getter alloy in form of powder, of powders pressed in pills, laminated on suitable metal sheets or positioned inside suitable containers, and in the form of thin films, typically having thickness of some microns.

The preferred technique for manufacturing said thin films is by sputtering of suitable targets of alloy, which is typically sintered or pressure-sintered. This getter material films can be directly deposited on an internal surface of the hydrogen-sensitive device, or on a support used in the manufacture of said sensitive device, wherein the getter material will obviously be directed towards the internal surface of the device and therefore in contact with the device internal atmosphere.

Also the method according to the present invention may advantageously exploit some or all the features previously described with regard to the possible characteristics of the getter alloys previously described.

The previously explained considerations regarding the positioning of the getter material which is subject-matter of the present invention are general and are suitable for the employment thereof independently on the mode of use of the material or of the particular structure of the container thereof.

In a third aspect thereof, the invention consists in a hydrogen-sensitive device wherein hydrogen is removed by means a non-evaporable getter alloy comprising a first element formed of yttrium or a yttrium equivalent mixture and a second element selected among Si, B, Ge, Pd, Cd, In, Sb, Tl, Pb, Bi, Ag, wherein the atomic percentage of said first element is:

comprised between 65 and 98% in case that said second element is selected among Si, Ge, Pd, Cd, In, Sb, Tl, Pb, Bi;

comprised between 50 and 98% in case said element is Ag; or comprised between 30 and 98% in case said element is B.

The use of the alloy having silicon or antimony as second element is particularly preferred in case the sensitive device is a solar collector.

The invention will be further illustrated by means of the following examples. These non-limiting examples illustrate some embodiments which are intended to teach the skilled persons how to put the invention into practice and to represent the best mode to carry out the invention.

EXAMPLE 1

Several alloy samples were prepared starting from pure yttrium and a second element in an arc oven in the presence of argon, wherein the melting temperature depends on the specific kind of the produced alloy and is being varied between 1200° C. and 1500° C.

The melting process produces bars which were subsequently crushed in sieved powders in order to have a particle size lower than 150 μm.

Finally 150 mg of alloy were pressed in suitable annular containers; in particular, according to the above, samples 1-9 and comparative samples c1-c3 were prepared, the latter by operating in conditions different form those according to the invention; in particular sample c1 concerns an alloy obtained in a different range of composition; whereas c2 and c3 are obtained with different chemical compositions.

The description of said samples is given in Table 1:

TABLE 1

| Sample | Composition | Atomic Percentage |
|---|---|---|
| Sample 1 | Y-B | Y = 92 B = 8 |
| Sample 2 | Y-Pd | Y = 92 Pd = 8 |
| Sample 3 | Y-Ge | Y = 92 Ge = 8 |
| Sample 4 | Y-Sb | Y = 92 Sb = 8 |
| Sample 5 | Y-Si | Y = 92 Si = 8 |
| Sample 6 | Y-In | Y = 92 In = 8 |
| Sample 7 | Y-Pb | Y = 92 Pb = 8 |
| Sample 8 | Y-Bi | Y = 92 Bi = 8 |
| Sample 9 | Y-Ag | Y = 92 Ag = 8 |
| Sample c1 | Y-Si | Y = 59 Si = 41 |
| Sample c2 | Zr-CO-MM | Zr = 80, Co = 15 A = 5 |
| Sample c3 | Zr-Fe-Y | Zr = 70 Fe = 15 Y = 15 |

The powders of alloy pressed in the containers were then characterized in different experiments.

EXAMPLE 2

The previous samples were characterized for the hydrogen sorbing capacity by being maintained at 200° C.

In particular, in Table 2 the quantities of sorbed hydrogen are given, expressed in hPa*l/g before the pressure measured in the spectrometer raises higher than $10^{-4}$ hPa: said datum therefore provides an experimental characterization of the total capacity of the alloy.

TABLE 2

| Sample | Composition | Quantity of sorbed hydrogen (hPa*l/g) with $H_2$ equilibrium pressure being <$10^{-4}$ hPa |
|---|---|---|
| Sample 1 | Y-B | 247 |
| Sample 2 | Y-Pd | 228 |
| Sample 3 | Y-Ge | 216 |
| Sample 4 | Y-Sb | 214 |
| Sample 5 | Y-Si | 211 |
| Sample 6 | Y-In | 191 |
| Sample 7 | Y-Pb | 177 |
| Sample 8 | Y-Bi | 174 |

The characterization of comparative samples gave particularly negative results: in particular with comparative sample c1, alloy Y(59%)-Si(41%), showed an equilibrium pressure of about 1 hPa.

Sample c2, i.e. a sample of the alloy St787, which is very prized in the technical field for the features thereof, cannot give a value lower than $10^{-3}$ Torr when exposed to a $H_2$ quantity of about 130 hPa*l/g.

EXAMPLE 3

This experiment explores the features of the samples regarding their $H_2$ sorbing capacity in a nitrogen flow. Said gas is critical since an interaction of the getter material with nitrogen can occur with the consequent decrease of the capacity for $H_2$.

The samples were tested at 400° C., by exposing them to a gas flow (of about 120 cc/min at atmospheric pressure) of $N_2$ containing 1% $H_2$ and by measuring with a gas chromatographer the getter capacity to reduce the hydrogen concentration in the experimental set-up.

The results regarding capacity, that is, the total quantity of hydrogen removed by the getter before saturation thereof, measured in the test conditions are given in Table 3.

TABLE 3

| Sample | Composition | Capacity (hPa*l/g) |
|---|---|---|
| Sample 1 | Y-B | 170 |
| Sample 2 | Y-Pd | 146 |
| Sample 3 | Y-Ge | 159 |
| Sample 4 | Y-Sb | 210 |
| Sample 5 | Y-Si | 148 |
| Sample 7 | Y-Pb | 173 |
| Sample 8 | Y-Bi | 131 |
| Sample 9 | Y-Ag | 118 |
| Sample c3 | Zr-Fe-Y | 112 |

In this case it was preferred to compare the alloys according to the invention with comparative sample c3, which corresponds to the alloy marketed by the Applicant under the name St777®, which is an alloy currently appreciated in the field.

EXAMPLE 4

This experiment investigates the sample capacity to sorb a different gas, CO at 25° C., after an activation process at reduced temperature, that is, 200° C. The obtained results are shown in Table 4.

TABLE 4

| Sample | Composition | CO quantity sorbed at 25° C. (hPa*l/g) |
|---|---|---|
| Sample 1 | Y-B | 0.0083 |
| Sample 2 | Y-Pd | 0.0005 |
| Sample 3 | Y-Ge | 0.0048 |

TABLE 4-continued

| Sample | Composition | CO quantity sorbed at 25° C. (hPa*l/g) |
|---|---|---|
| Sample 4 | Y-Sb | 0.0189 |
| Sample 5 | Y-Si | 0.0013 |
| Sample 6 | Y-In | 0.0007 |
| Sample 8 | Y-Bi | 0.0012 |

EXAMPLE 5

This example characterizes the equilibrium pressure of hydrogen of sample 5, made with the Y—Si alloy at different temperatures, after that the sample has sorbed a significant quantity of hydrogen, that is 130 hPa*l/g. The obtained results are shown in Table 5.

TABLE 5

| Sample | Temperature (° C.) | $H_2$ equilibrium pressure (Torr) |
|---|---|---|
| Sample 5: Y-Si | 500 | $<10^{-4}$ |
| Sample 5: Y-Si | 550 | $\approx 10^{-4}$ |
| Sample 5: Y-Si | 600 | $\approx 10^{-3}$ |

EXAMPLE 6

This example characterizes the capability to absorb another gaseous impurity, Nitrogen, by the getter material after activation at 400° C. and with the material kept at high temperature, 200° C.

| Sample | Composition | $N_2$ quantity sorbed at 200° C. (hPa*l/g) |
|---|---|---|
| Sample 1 | Y-B | 0.016 |
| Sample 2 | Y-Pd | 0.014 |
| Sample 3 | Y-Ge | 0.014 |
| Sample 4 | Y-Sb | 0.226 |
| Sample 5 | Y-Si | 0.053 |
| Sample 6 | Y-In | 0.019 |
| Sample 7 | Y-Pb | 0.030 |
| Sample 8 | Y-Bi | 0.056 |

EXAMPLE 7

The produced samples were also characterized with an X-ray diffractometer for evaluating the main phases of the alloy.
The obtained results are given in Table 6.

TABLE 6

| Sample | Composition | Phase |
|---|---|---|
| Sample 1 | Y-B | Y-$YB_2$ |
| Sample 2 | Y-Pd | Y-$Y_5Pd_2$ |
| Sample 3 | Y-Ge | Y-$Y_5Ge_3$ |
| Sample 4 | Y-Sb | Y-$Y_3Sb$ |
| Sample 5 | Y-Si | Y-$Y_5Si_3$ |
| Sample 6 | Y-In | Y-$Y_2In$ |
| Sample 7 | Y-Pb | Y-$Y_5Pb_3$ |
| Sample 8 | Y-Bi | Y-$Y_5Bi_3$ |

As it can be appreciated from example 2 results, the materials according to the invention can guarantee a low $H_2$ equilibrium pressure by operating at 200° C., even after having sorbed significant quantities of $H_2$, particularly they are all capable of ensuring pressures lower than $10^{-4}$ hPa after sorption of 170 hPa*l/g of hydrogen that is more than 30% more capacity with respect to the St 787® alloy, which can be taken as reference for the field.

Example 3 shows that the alloys according to the invention, if used in a nitrogen atmosphere, have at least 20% more capacity with respect to the St 777® alloy, which can be taken as reference for the field, apart from Y—Ag that has comparable and anyway slightly better features.

Example 4 shows the capacity of the alloys according to the invention to sorb CO, even if activated at low temperature.

Example 5 shows that the alloys according to the invention, with particular reference to the Y—Si, are capable of effectively sorbing hydrogen even at very high temperatures. And also at 600° C. they still have a good, even if reduced, capacity.

Example 6 shows that Y—Si, Y—Sb, Y—Bi have the best sorption characteristics when kept at a relatively high temperature, i.e. 200° C., a temperature that is halfway between ambient temperature and the activation temperature, making these alloys preferred in the use within getter pumps.

Example 7 shows that the alloys according to the invention are formed of at least an intermetallic phase of the second element of the alloy with yttrium.

Therefore, the previous experiments show that there is a strong dependence of the alloy of yttrium or yttrium equivalent mixture with a second element, both on the chemical nature of this second element, and on the atomic ratio between the first and the second component.

The invention claimed is:

1. A method for removing hydrogen from a device which is sensitive to presence thereof, the method comprising providing within said device, a non-evaporable getter alloy, the non-evaporable getter alloy consisting of a first element containing at least 99% by atoms of yttrium or a yttrium mixture containing at least 95% by atoms of yttrium, up to 4% of rare earths and up to 1% of inevitable trace elements, and a second element selected among Si, B, Ge, Cd, In, Sb, Tl, Pb, Ag, and Bi wherein the atomic percentage of said first element is:
   comprised between 65 and 98% if said second element is selected among Si, Ge, Cd, In, Sb, Tl, Pb, and Bi;
   comprised between 50 and 98% if said second element is Ag; or
   comprised between 30 and 98% if said second element is B; and wherein the balance is given by the second element.

2. The method according to claim 1 further comprising heating the alloy to a temperature equal to or higher than 100° C.

3. The method according to claim 1 wherein the atomic percentage of the second element is at least 5%.

4. The method according to claim 1 wherein the atomic percentage of the second element is at least 8%.

5. The method according to claim 1 wherein said getter alloy is present in the form of a thin film.

6. The method according to claim 5 further comprising producing the film by sputtering, or e-beam evaporation.

7. The method according to claim 1 wherein the device is a gas purification system.

8. The method according to claim 1 wherein said getter alloy is used in getter pumps.

9. A hydrogen sensitive device comprising a non-evaporable getter alloy within the device, wherein hydrogen is removed by the non-evaporable getter alloy, the non-evaporable getter alloy consisting of a first element containing at least 99% by atoms of yttrium or a yttrium mixture containing at least 95% by atoms of yttrium, up to 4% of rare earths and up to 1% of inevitable trace elements, and a second element selected among Si, B, Ge, Cd, In, Sb, Tl, Pb, Bi, and Ag, wherein the atomic percentage of said first element is:

comprised between 65 and 98% in case that said second element is selected among Si, Ge, Cd, In, Sb, Tl, Pb, and Bi; comprised between 50 and 98% in case said second element is Ag; or comprised between 30 and 98% in case said second element is B; and wherein the balance is given by the second element.

10. The hydrogen-sensitive device according to claim 9 wherein said device is a solar collector.

11. The hydrogen-sensitive device according to claim 10 wherein said second element is silicon or antimony.

12. The hydrogen-sensitive device according to claim 9 wherein said device is an illumination lamp.

13. The hydrogen-sensitive device according to claim 12 wherein said second element is selected among Si, B, Ge.

14. The hydrogen-sensitive device according to claim 9 wherein said device is a getter pump.

15. The hydrogen-sensitive device according to claim 14 wherein said second element is selected among Si, Sb, Bi.

16. A method for removing hydrogen from a device which is sensitive to presence thereof, the method comprising providing within said device, a non-evaporable getter alloy, the non-evaporable getter alloy consisting of a first element containing at least 99% by atoms of yttrium or a yttrium mixture containing at least 95% by atoms of yttrium, up to 4% of rare earths and up to 1% of inevitable trace elements, and a second element, the second element being Pd, wherein the atomic percentage of said first element is:

comprised between 65 and less than 85%; and the balance is given by the second element.

17. A hydrogen-sensitive device comprising a non-evaporable getter alloy within the device, wherein hydrogen is removed by the non-evaporable getter alloy, the non-evaporable getter alloy consisting of a first element containing at least 99% by atoms of yttrium or a yttrium mixture containing at least 95% by atoms of yttrium, up to 4% of rare earths and up to 1% of inevitable trace elements, and a second element, the second element being Pd, wherein the atomic percentage of said first element is:

comprised between 65 and less than 85%; and the balance is given by the second element.

\* \* \* \* \*